(12) United States Patent
Nakabo et al.

(10) Patent No.: US 6,927,928 B2
(45) Date of Patent: Aug. 9, 2005

(54) SUPPORT STRUCTURE OF A MAGNETIC HEAD AND MAGNETIC CARD READER

(75) Inventors: Akinobu Nakabo, Kyoto (JP); Masanobu Okada, Kyoto (JP)

(73) Assignee: Omron Corporation, Kyoto (JP)

( * ) Notice: Subject to any disclaimer, the term of this patent is extended or adjusted under 35 U.S.C. 154(b) by 374 days.

(21) Appl. No.: 09/969,091

(22) Filed: Oct. 3, 2001

(65) Prior Publication Data
US 2002/0093749 A1 Jul. 18, 2002

(30) Foreign Application Priority Data
Oct. 6, 2000 (JP) ........................................ 2000-307501

(51) Int. Cl.[7] .............................................. G11B 25/04
(52) U.S. Cl. ........................................... 360/2; 360/240
(58) Field of Search ............................ 360/2, 240, 241, 360/241.3, 251, 251.1, 251.3, 133

(56) References Cited

U.S. PATENT DOCUMENTS

| | | | | |
|---|---|---|---|---|
| 4,375,071 A | * | 2/1983 | Crowley et al. ............ 360/240 |
| 5,270,523 A | * | 12/1993 | Chang et al. ............... 235/449 |
| 6,338,436 B1 | * | 1/2002 | Iguchi et al. ............... 235/488 |
| 6,342,982 B1 | * | 1/2002 | Kanayama et al. ............ 360/2 |

* cited by examiner

Primary Examiner—David Hudspeth
Assistant Examiner—Daniell L. Negron
(74) Attorney, Agent, or Firm—Dickstein Shapiro Morin & Oshinsky LLP

(57) ABSTRACT

There is provided a support structure for a magnetic head in which a magnetic head having a function of being capable of following a warp or the like of a magnetic card can be easily attached and detached without using a fastening member such as a screw. A support structure for a magnetic head for swingably supporting a magnetic head includes a fixed member fixed to a fixed portion, a movable member rotatably supported by the fixed member and urged toward a fixed position, and support shafts protrusively provided at the front and back of the magnetic head, in which groove portions for removably supporting the support shafts are formed at corresponding portions of the fixed member and the movable member in one of them in a vertical direction and in the other in a horizontal direction.

20 Claims, 12 Drawing Sheets

SUPPORT STRUCTURE OF A MAGNETIC HEAD AND MAGNETIC CARD READER

BACKGROUND OF THE INVENTION

1. Field of the Invention

The present invention relates to a support structure for a magnetic head for reading out magnetic information from or writing it into a magnetic recording medium of a magnetic card, and a magnetic card reader.

2. Description of the Related Art

Conventionally, a support structure for a magnetic head is disposed in a magnetic card reader, for example, such as one shown in FIG. 12.

That is, guide pins 92, 92 are provided at a fixed plate 91 provided at an apparatus main body side of a card reader, a movable plate 93 capable of moving vertically along the guide pins 92, 92 is provided, a magnetic head 96 is fitted to the movable plate 93 through a fastening member such as a screw 94 and a head holding bracket 95, and the magnetic head 96 is urged toward a side of a magnetic card 98 by urging means 97 such as a spring through the movable plate 93.

According to this conventional structure, the magnetic head 96 follows the magnetic card 98 and moves vertically together with the movable plate 93, and when a hole portion 99 in which the guide pin 92 is inserted functions as an idle insert hole, the magnetic head 96 can be displaced in accordance with a warp of the magnetic card 98.

However, in the support structure for the magnetic head of the conventional structure, since the magnetic head 96 is fitted by using the fastening member such as the screw 94, there have been problems, including that it is impossible to easily attach and detach the magnetic head 96 itself, and it is difficult to form a swing type magnetic head structural body into a unit.

SUMMARY OF THE INVENTION

An object of the present invention is to provide a support structure for a magnetic head in which a magnetic head having a function of being capable of following a warp or the like of a magnetic card can be easily attached and detached without using a fastening member such as a screw.

Another object of the present invention is to provide a magnetic card reader having a support structure for a magnetic head superior in attachment/detachment properties.

A support structure for a magnetic head according to the present invention is a support structure for swingably supporting a magnetic head, which comprises a fixed member fixed to a fixed portion, a movable member rotatably supported by the fixed member and urged toward a fixed position, and support shafts protrusively provided at the front and back of the magnetic head, and in which groove portions for removably supporting the support shafts are formed at corresponding portions of the fixed member and the movable member in one of them in a vertical direction and in the other in a horizontal direction.

The swing direction of the magnetic head can be set in a card width direction orthogonal to a transfer direction of the magnetic card.

With respect to the groove portions, the groove portion in the vertical direction can be formed at a side of the fixed member and the groove portion in the horizontal direction can be formed at a side of the movable member.

According to the present invention, when the movable member rotatably supported by the fixed member is rotated in the direction opposite to the fixed position against an urging force, since the support shafts at the side of the magnetic head can be attached to and detached from the groove portions, the magnetic head can be easily attached and detached without using a fastening member such as a screw.

Besides, after the mounting of the magnetic head, since the magnetic head is rotatably supported by the support shafts, as supporting points, protrusively provided at the front and back thereof, it becomes rotatable correspondingly to the width direction of the magnetic card, for example, and can cope with a warp of the magnetic card.

According to an aspect of the present invention, the movable member is made C-shaped.

According to the above structure, by the C-shaped structure of the movable member, it is possible to prevent the magnetic head from varying in the front-back direction of card transfer.

A magnetic card reader of the present invention includes the support structure of the magnetic head of the above structure.

According to the above structure, it is possible to construct the magnetic card reader superior in following the surface characteristics of a magnetic card and in attachment/detachment properties of the magnetic head.

DETAILED DESCRIPTION OF THE PREFERRED EMBODIMENTS

An embodiment of the present invention will be described below in detail with reference to the drawings.

Figure 1:
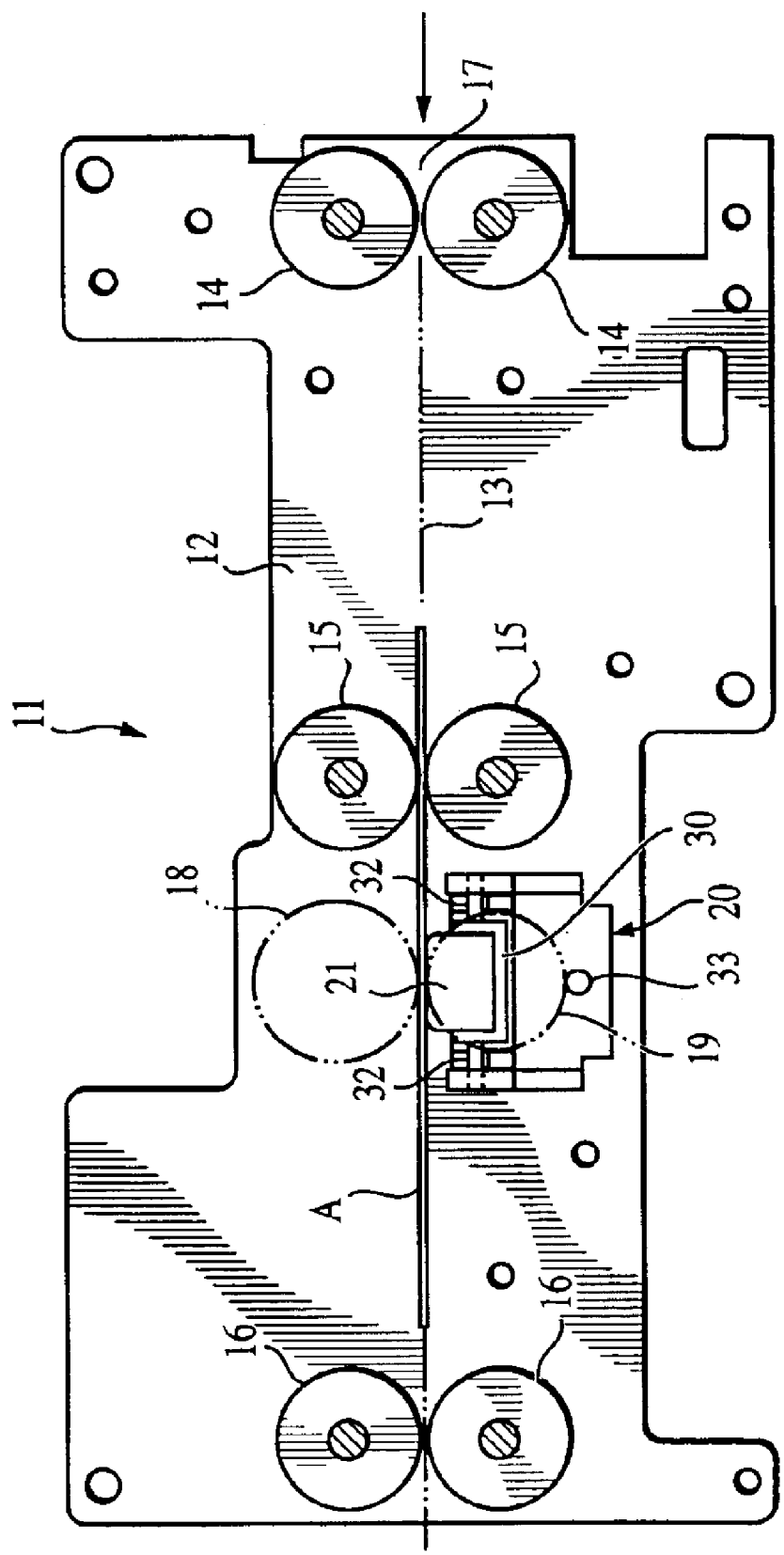
FIG. 1 is a sectional view of a magnetic card reader including a support structure for a magnetic head of the present invention.

The drawings show a magnetic card reader including a support structure for a magnetic head, and in FIG. 1, this magnetic card reader 11 is constructed such that transfer rollers 14, 14, 15, 15, 16, 16 are provided at upper and lower opposite positions of a card transfer line 13 formed in a card reader main body 12, and a magnetic card A is reversibly transferred along the card transfer line 13 from an exit/inlet portion 17 of the magnetic card reader 11.

A press roller 18 and a transfer roller 19 are provided to be vertically opposite to each other between the foregoing transfer rollers 15 and 16, and a magnetic head unit 20 is provided at the side of the transfer roller 19, that is, the lower side of the card transfer line 13.

The magnetic head unit 20 includes a magnetic head 21, and is constructed such that reading, writing, and erasing of magnetic information with respect to a magnetic recording medium of the magnetic card A is executed by this magnetic head 21.

Figure 2:
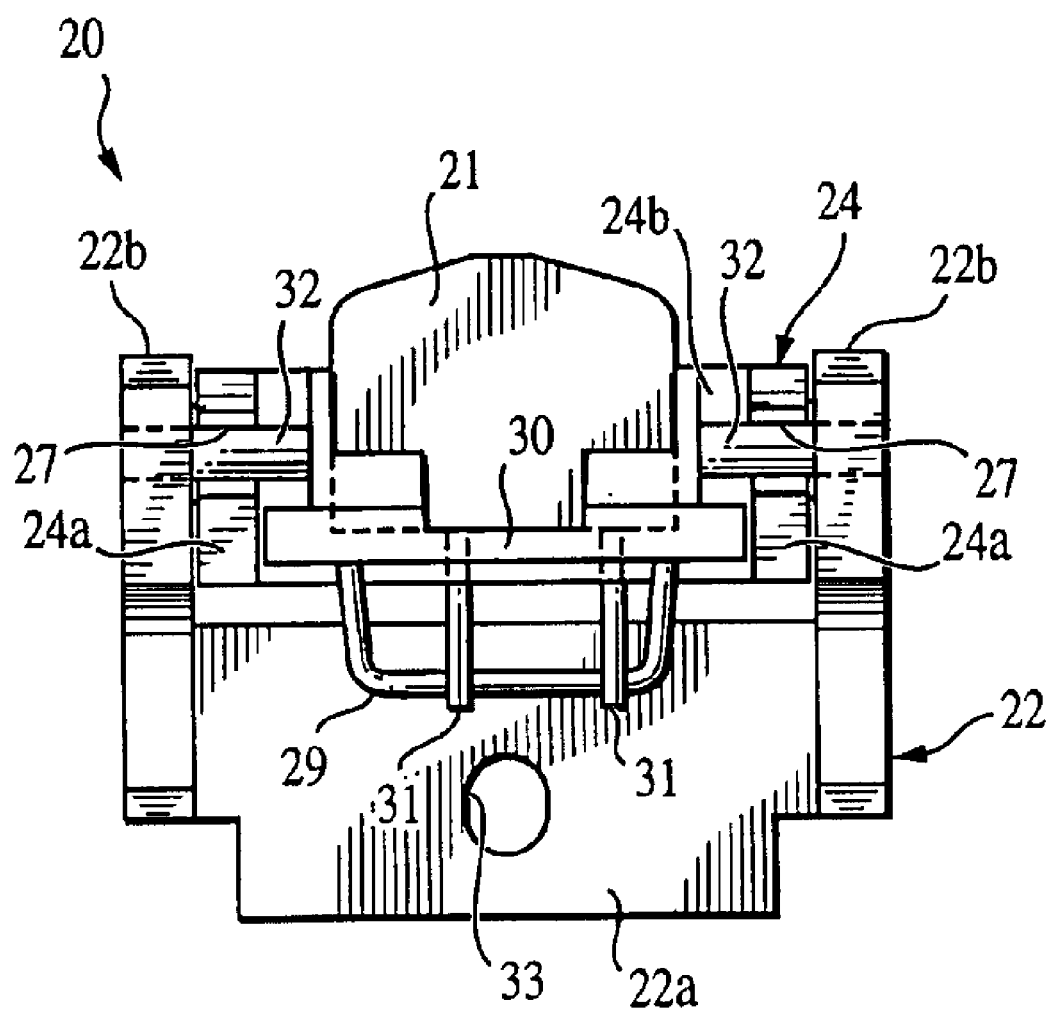
FIG. 2 is a front view showing the support structure for the magnetic head.
Figure 3:
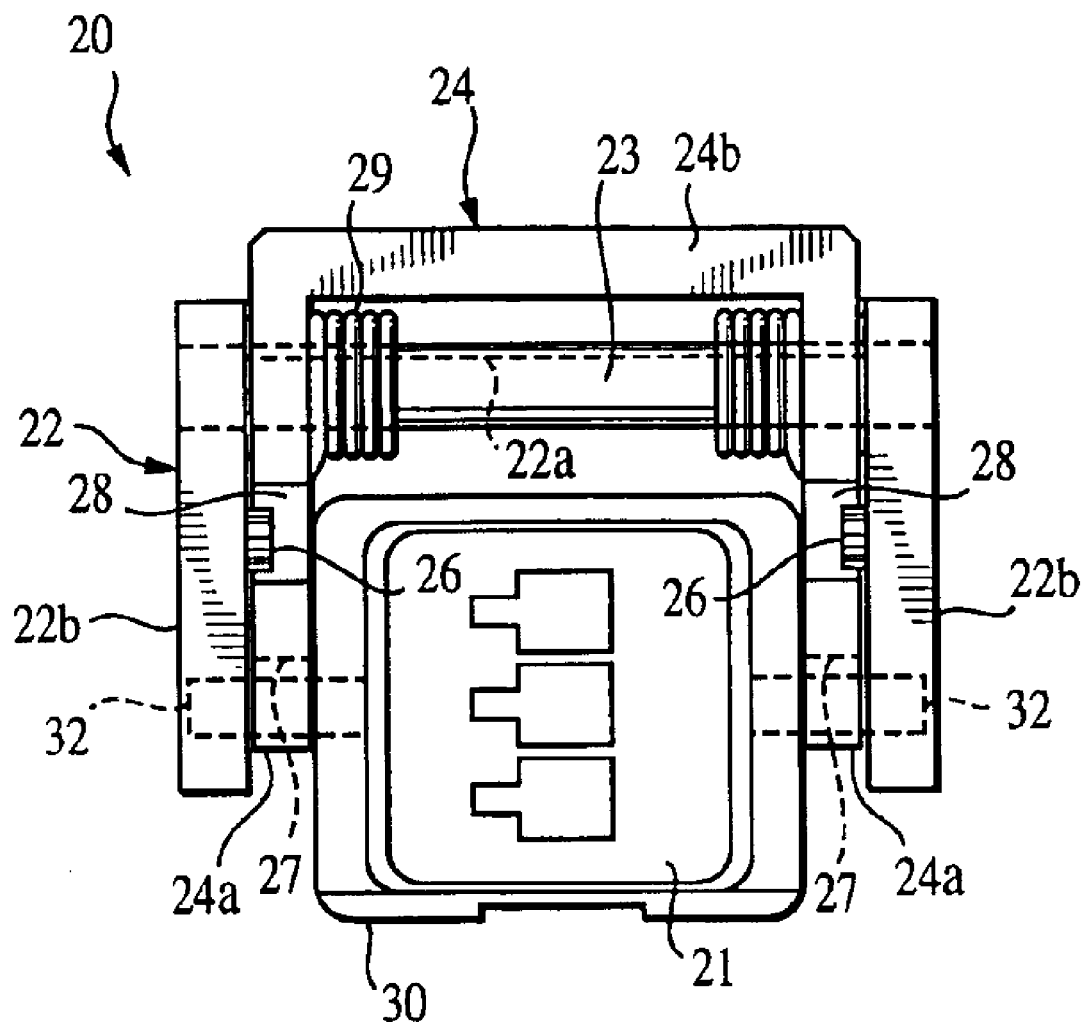
FIG. 3 is a plan view of FIG. 2.
Figure 4:
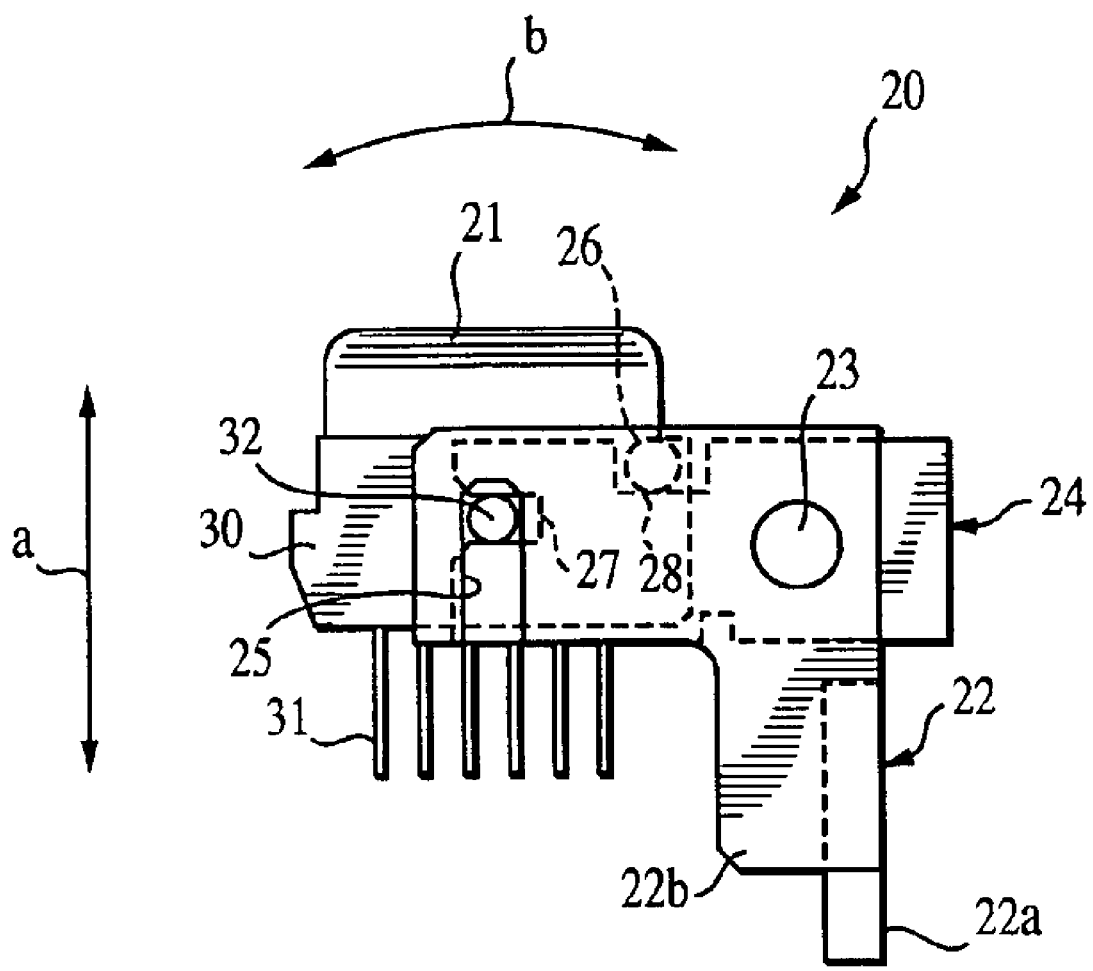
FIG. 4 is a right side view of FIG. 2.

The magnetic head unit 20 is constructed as shown in a front view of FIG. 2, a plan view of FIG. 3, and a side view of FIG. 4. First, a support structure for a magnetic head in a state where the magnetic head 21 is removed will be described with reference to FIGS. 5, 6 and 7.

The support structure for the magnetic head includes a fixed member 22 fixed to the card reader main body 12 as a fixed portion, and a movable member 24 rotatably supported by the fixed member 22 by using a support shaft 23.

The fixed member 22 includes a substantially flat base portion 22a, and reversed L-shaped side plate portions 22b, 22b extending forward from this base portion 22a at right angles, and the support shaft 23 is extended between corner portions of the reversed L-shaped side plate portions 22b, 22b.

Figure 7:
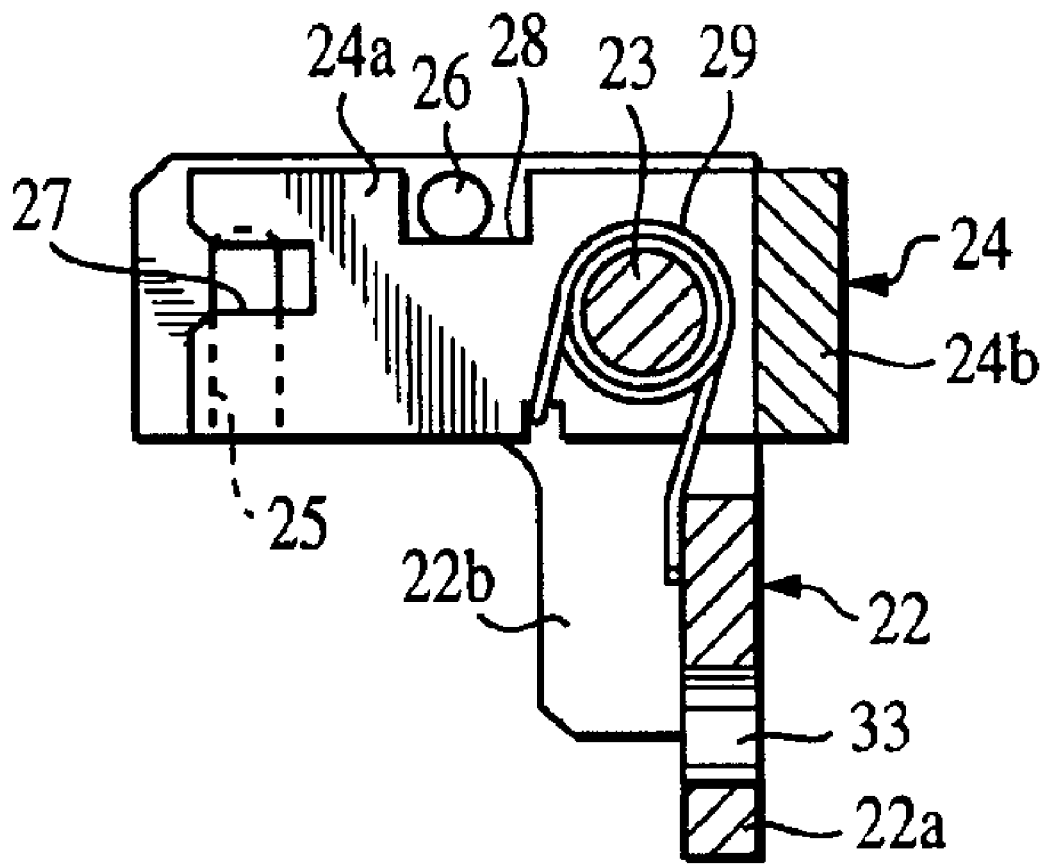
FIG. 7 is a sectional view seen from an arrow of line B-B of FIG. 5.

The reversed L-shaped side plate portion 22b includes an upper horizontal portion and a lower vertical portion as shown it FIG. 7, and a vertical direction groove portion 25 is formed in a front end portion of the horizontal portion. This groove portion 25 is directed in the vertical direction, and its lower portion is open.

Although cylindrical stoppers 26, 26 opposite to each other are shown integrally formed at upper sides of front-back direction intermediate portions of the horizontal portions of the side plate portions 22b, this stopper 26 may have a prismatic shape.

On the other hand, in the movable member 24 a base member of which is fixed to the support shaft 23, a pair of arm portions 24a, 24a are integrally coupled by a coupling portion 24b, and the movable member is made C-shaped when seen on a plane.

Here, groove portions 27, 27 extending in the horizontal direction are formed at idle end sides of the arm portions 24a, 24a. The groove portion 27 is such a groove portion that its tip end is open, and in this embodiment, a taper portion is continuously provided at the tip end of the groove 27, so that insertion operation of the magnetic head 21 is improved.

In the foregoing arm portions 24a, 24a, a concave engagement portion 28 is formed at a portion corresponding to the stopper 26 at the side of the fixed member 22.

Further, a spring 29 for urging the movable member 24 toward the fixed position (position where the engagement portion 28 is in contact with the stopper 26) is provided at the support shaft 23.

Figure 5:
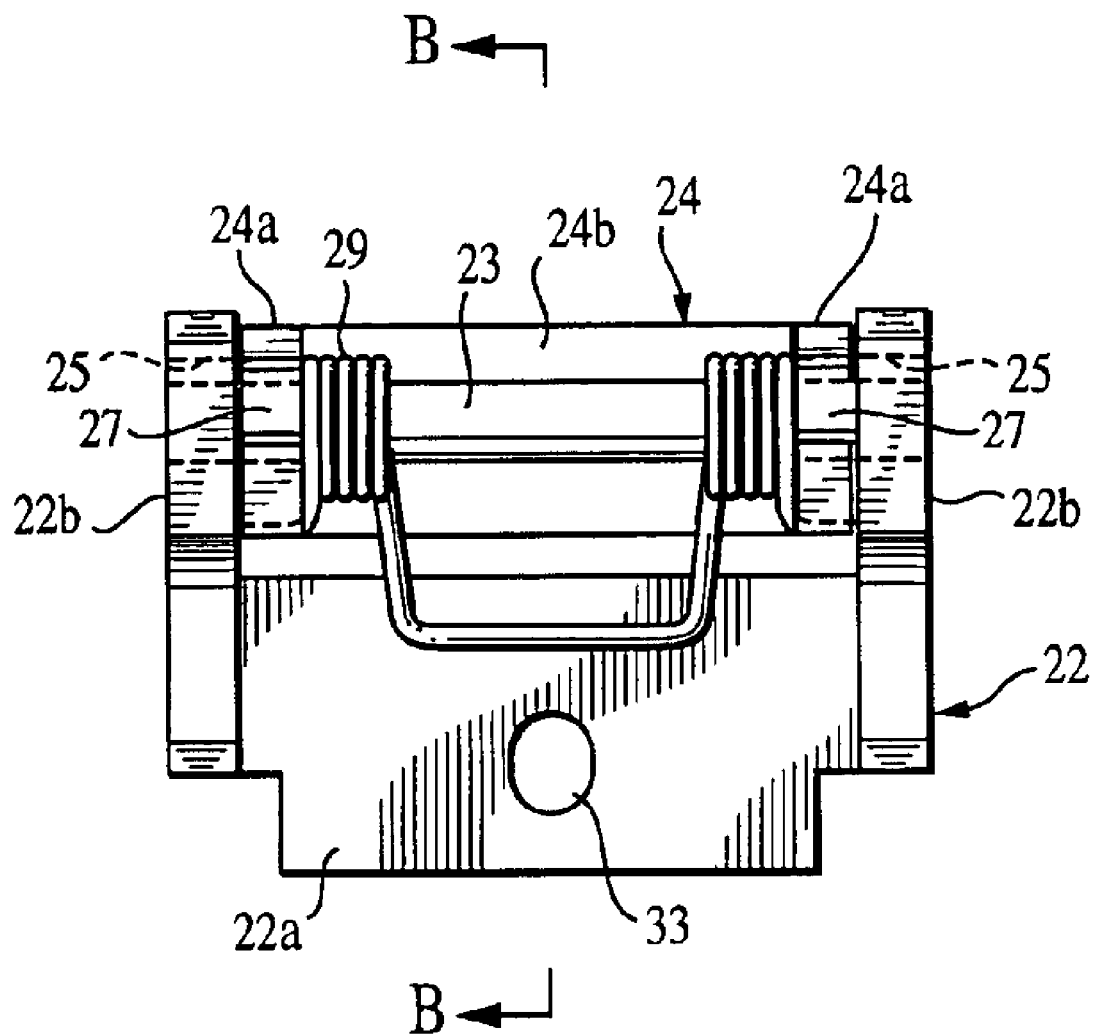
FIG. 5 is a front view of the support structural body shown in a state where a magnetic head is taken away.
Figure 6:
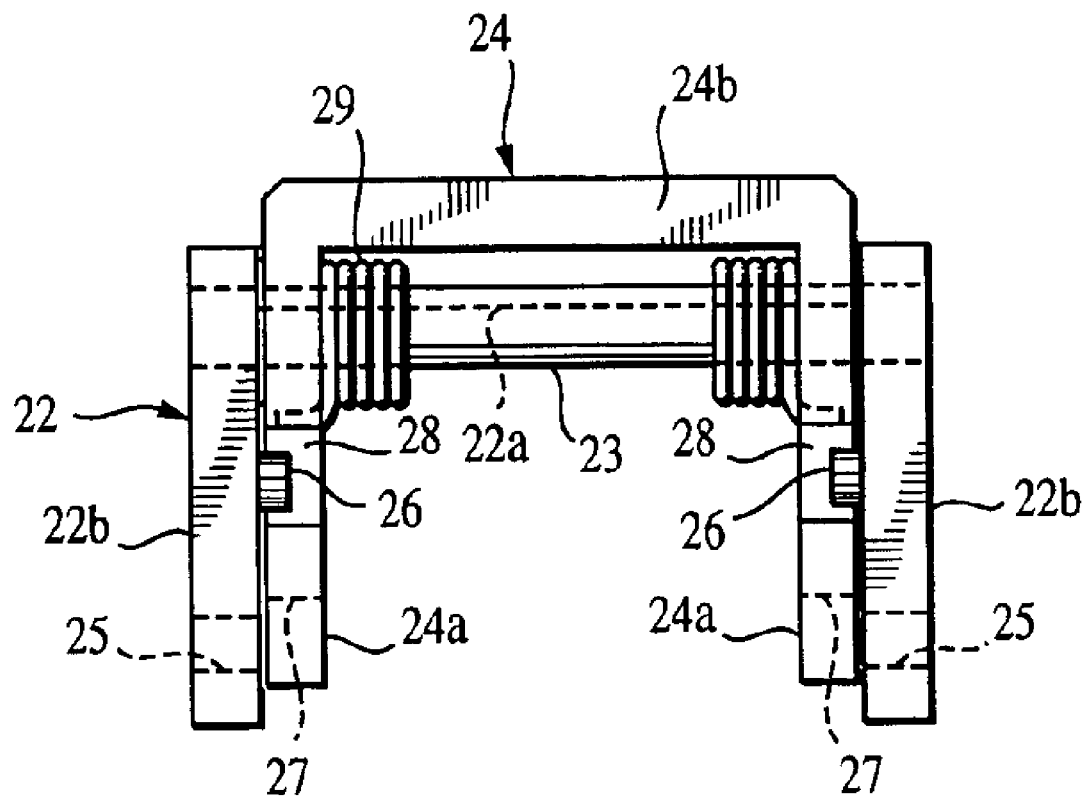
FIG. 6 is a plan view of FIG. 5.

Under the condition that the movable member 24 is urged toward the fixed position by the spring 29 as shown in FIGS. 5, 6 and 7, the respective groove portions 25 and 27 are formed to intersect with each other.

Figure 8:
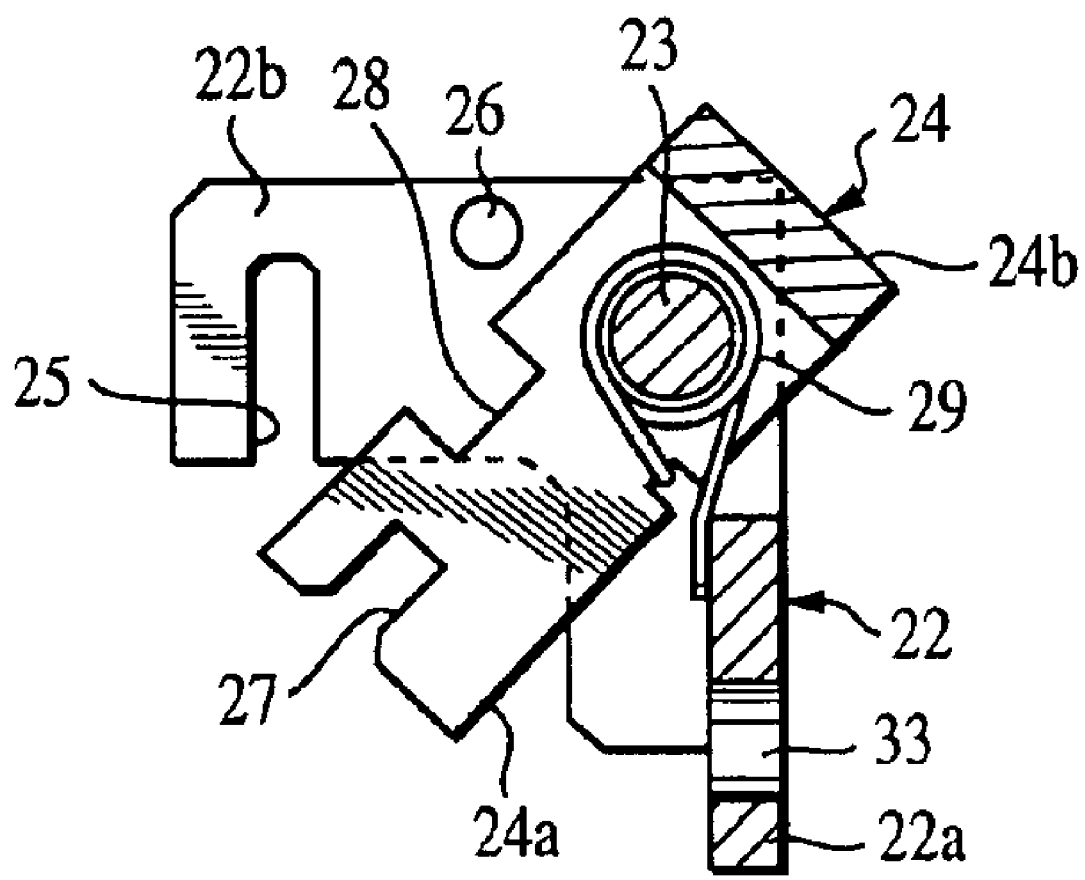
FIG. 8 is a sectional view showing a depressed state of a movable member.

Since the movable member 24 is structured to be rotatable with the support shaft 23 as the supporting and pivoting point, a rotating operation can be made from the fixed position of FIG. 7 to a magnetic head attachment/detachment position of FIG. 8 against the spring force of the spring 29 as urging means.

Figure 9:
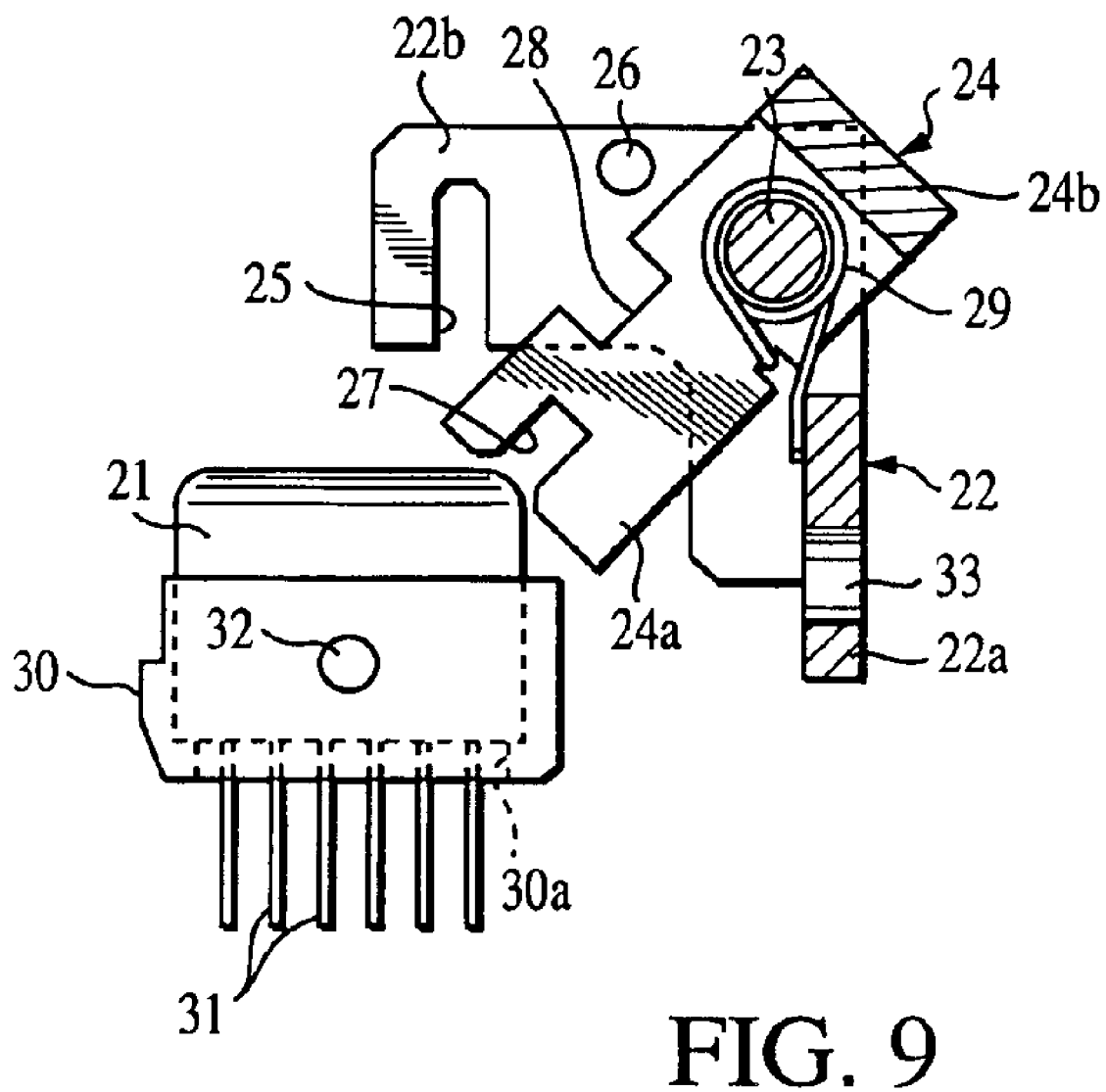
FIG. 9 is a sectional view showing an attachment/detachment state of a magnetic head.

At a lower portion of the magnetic head 21, as shown in FIGS. 1 and 9, a head body holding bracket 30 (hereinafter simply referred to as a bracket) is fixed, and lead terminals 31 of the magnetic head 21 protrude downward from an opening portion 30a of the bracket 30.

Further, a pair of support shafts 32 are protrusively fixed to the front and back of the bracket 30 correspondingly to the front-back direction (direction along the transfer direction of the magnetic card A) of the magnetic head 21.

In order to fit the magnetic head 21 to the support structure shown in FIGS. 5, 6 and 7, first, the movable member 24 at the fixed position shown in FIG. 7 is rotated around the support shaft 23 as the supporting and pivoting point by the depressing operation toward the magnetic head attachment/detachment position of FIG. 8 against the spring force (urging force) of the spring 29.

Figure 10:
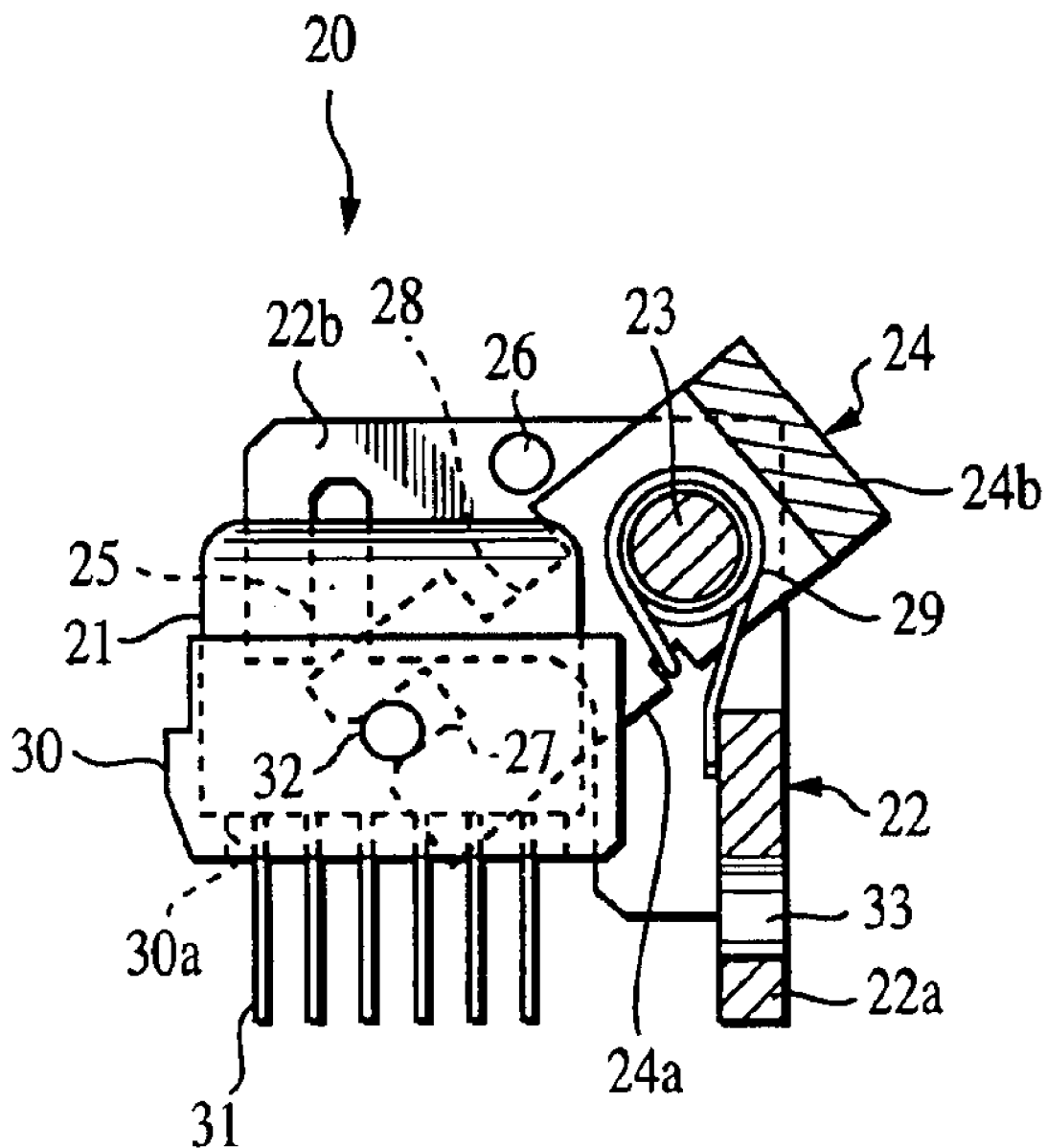
FIG. 10 is a sectional view showing an attachment/detachment state of the magnetic head.

Next, after the magnetic head 21 including the bracket 30 and the support shafts 32 is made to approach the tip end of the movable member 24 as shown in FIGS. 9 and 10, the pair of support shafts 32, 32 are inserted in the horizontal direction grooves 27, 27 of the pair of arm portions 24a, 24a of the movable member 24.

Next, when the depressing force to the movable member 24 is released, while the pair of supporting shafts 32, 32 at the side of the magnetic head 21 keep a state where they are inserted in the horizontal direction groove portions 27, 27, both end portions thereof are inserted in the vertical direction groove portions 25, 25 of the pair of side plate portions 22b, 22b of the fixed member 22. Besides, the movable member 24 is urged to the fixed position where the concave engagement portion 28 comes in contact with the stopper 26 at the side of the fixed member 22, and the magnetic head unit 20 shown in FIG. 11 and FIGS. 2, 3 and 4 is obtained.

In the magnetic head unit 20 shown in FIGS. 2 to 4, the magnetic head 21 is swingable around the pair of supporting shafts 32, 32 as the supporting points in the width direction of the magnetic card A, and the pair of supporting shafts 32, 32 are supported by both the intersecting groove portions 25, 27 in a state where they are prevented from falling out. Further, the magnetic head 21 is held to be vertically movable through the movable member 24, and an urging load by the spring 29 is added to the magnetic head 21 at the time of downward movement of the magnetic head 21.

A hole portion 33 for fixing the magnetic head unit 20 to a predetermined portion of the card reader main body 12 is formed in the base portion 22a of the fixed member 22, and the magnetic head unit 20 is fixed to the predetermined portion of the card reader main body 12 by using a fitting member (not shown) to be inserted in the hole portion 33.

In order to take the magnetic head 21 away from the magnetic head unit 20, it is appropriate that an operation reverse to the operation at the time of fitting the magnetic head 21 is carried out.

Figure 11:
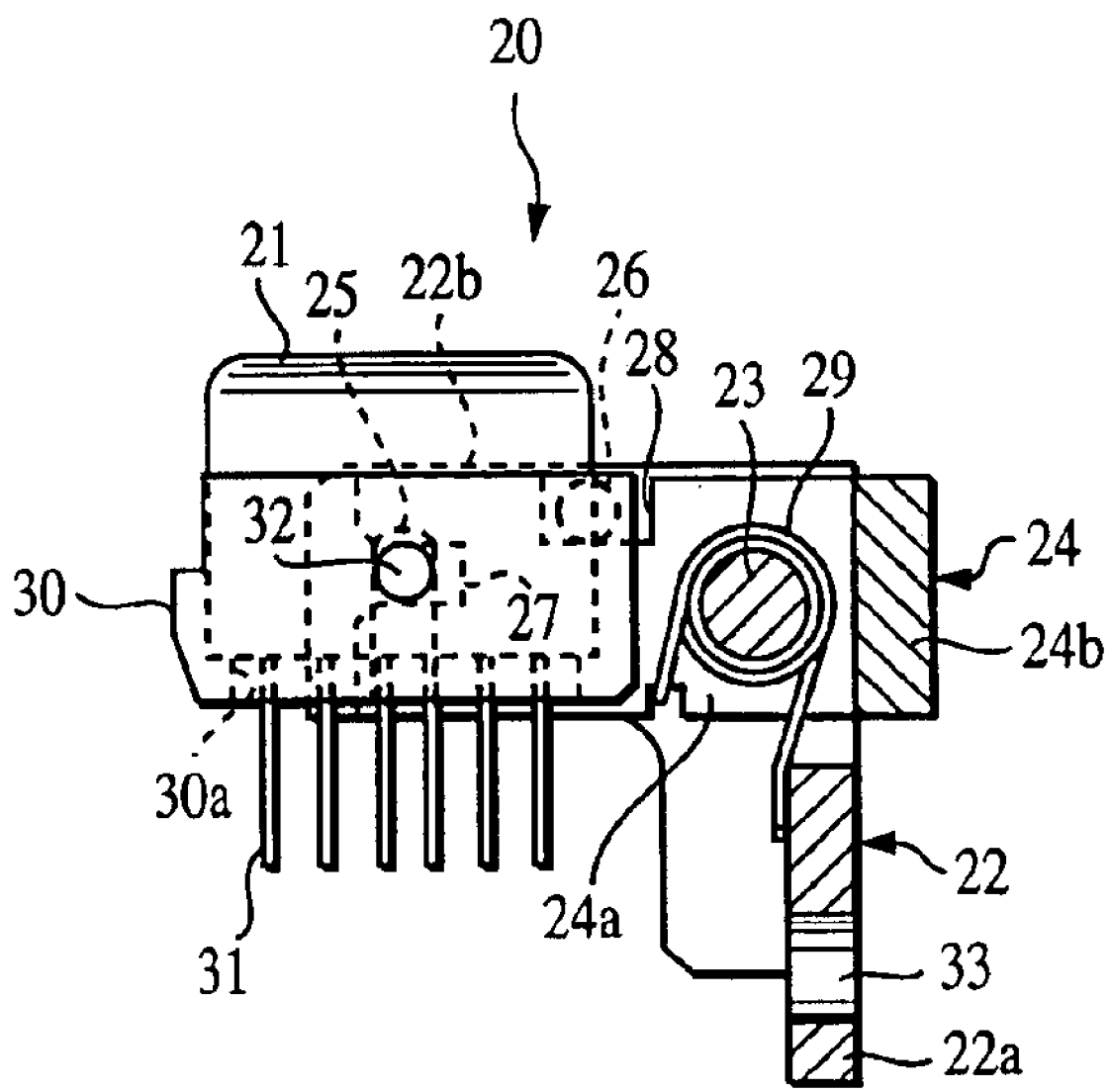
FIG. 11 is a sectional view showing a state where the magnetic head is urged to a fixed position.
Figure 12:
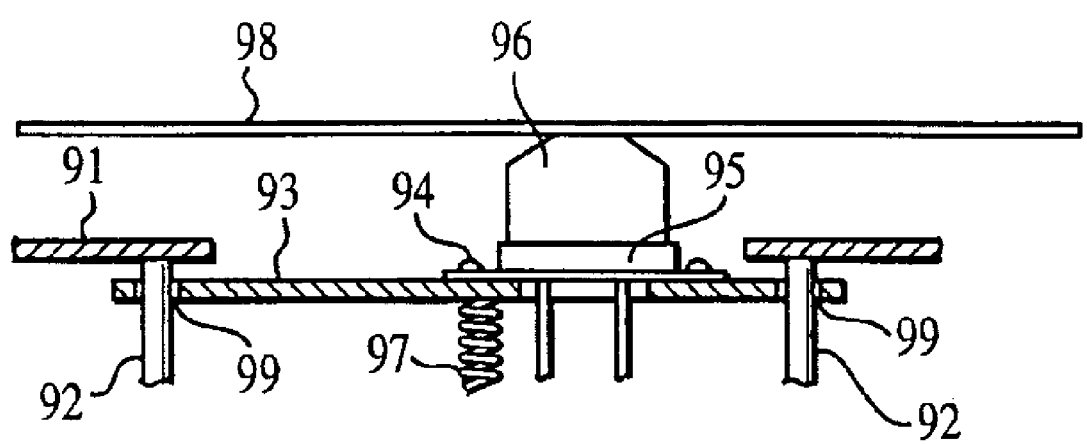
FIG. 12 is an explanatory view showing a conventional support structure for a magnetic head.

That is, the magnetic head 21 and the bracket 30 are depressed from the fixed position shown in FIG. 11, and at the magnetic head attachment/detachment position where the intersection state of the respective groove portions 25 and 27 disappears as shown in FIG. 10, the pair of supporting shafts 32, 32 are pulled out of the horizontal direction groove portions 27 of the movable member 24 with the magnetic head 21 and the bracket 30, and the magnetic head 21 can be taken away as shown in FIG. 9.

Like this, the support structure for the magnetic head of the embodiment is the support structure of the magnetic head 21 for supporting the magnetic head 21 swingably (see direction of arrow a of FIG. 4 and direction arrow b), which comprises the immovable fixed member 22 fixed to the card reader main body 12 as the apparatus main body, the movable member 24 rotatably supported by the fixed member 22 and urged toward the fixed position (see FIGS. 2 to 4) by the urging means, and the support shafts 32, 32 protrusively provided at the front and back of the magnetic head 21, and in which the groove portions 25, 27 for removably supporting the support shafts 32 are formed at the corresponding portions of the fixed member 22 and the movable member 24 in one (one of the members 22 and 24, and the fixed member 22 in this embodiment) in the vertical direction and in the other (the other of the members 22 and 24, and the movable member 24 of this embodiment) in the horizontal direction.

According to this structure, when the movable member 24 rotatably supported by the fixed member 22 is rotated in the direction (direction of the magnetic head attachment/detachment position shown in FIGS. 8 and 9) opposite to the fixed position against the urging force, since the support shafts 32 at the side of the magnetic head 21 can be attached to and detached from the groove portions 27, the magnetic head 21 can be easily attached and detached without using a fastening member such as a screw.

Besides, after the mounting of the magnetic head 21, since the magnetic head 21 is rotatably supported by the supporting shafts 32, as the supporting points, protrusively provided at the front and back thereof, it becomes rotatable (rotatable in the direction of the arrow b shown in FIG. 4) correspondingly to the width direction of the magnetic card A, and can cope with the warp of the magnetic card A.

Further, the movable member 24 can be made C-shaped when seen on the plane as shown in FIGS. 3 and 6. It is possible to prevent the magnetic head 21 from varying in the card transfer front-back direction by the C-shaped structure of the movable member 24.

On the other hand, since the magnetic card reader 11 (see FIG. 1) of the embodiment includes the support structure of the magnetic head 21 of the above structure, the magnetic card reader superior in following surface characteristics of the magnetic card A and in the attachment/detachment properties of the magnetic head 21 can be constructed, and can be used to be incorporated in various apparatuses, for example, an automatic teller machine requiring readout and/or writing of magnetic information to the magnetic card A, the so-called ATM and the like.

Besides, as shown in the above embodiment, since the respective components of the support shaft 23, the movable member 24, the magnetic head 21, the bracket 30, and the support shaft 32 are fitted to the fixed member 22 as the vertical guide part, these components can be formed into a unit with a small space and compactness.

In the correspondence of the structure of the present invention and the embodiment, the vertical direction groove portion of the present invention corresponds to the groove portion 25 at the side of the fixed member 22 (head fixing bracket member) of the embodiment, and similarly in the following, the horizontal direction groove portion corresponds to the groove portion 27 at the side of the movable member 24 (rotating arm member for holding the head).

According to the present invention, there is an effect that a magnetic head having a function of being capable of following a warp or the like of a magnetic card can be easily attached and detached without using a fastening member such as a screw.

While the foregoing has described in detail preferred embodiments known at the time, it should be readily understood that the invention is not limited to the disclosed embodiments. The invention can be modified to incorporate any number of variations, alterations, substitutions or equivalent arrangements not heretofore described, but which are commensurate with the spirit and scope of the invention. Accordingly, the invention is not limited to the embodiment specifically described but is only limited by the scope of the appended claims.

What is claimed is:

1. A support structure for a magnetic head for swingably supporting a magnetic head, comprising:
   a fixed member;
   a movable member rotarably supported by the fixed member and urged toward a fixed position; and
   support shafts protrusively provided at a front and a back of the magnetic head,
   wherein groove portions for removably supporting the support shafts are formed at corresponding portions of the fixed member and the movable member in one of them in a vertical direction and in the other in a horizontal direction.

2. The support structure for a magnetic head according to claim 1, wherein the movable member is a C-shaped movable member.

3. The support structure for a magnetic head according to claim 1 further comprising a magnetic card reader.

4. The support structure for a magnetic head according to claim 2 further comprising a magnetic card reader.

5. A card reader comprising:
   a magnetic head having a support surface;
   a first member having a first groove with an opening for receiving said support surface;
   a second member having a second groove with an opening for receiving said support surface, said second member being flexibly and pivotally attached to said first member such that in a first position said first groove and said second groove intersect to secure said support surface, and in a second position said first groove and said second groove are mis-aligned such that said support surface is released.

6. The card reader of claim 5 wherein said first member and said second member are urged toward said first position by a bias.

7. The card reader of claim 6 wherein said bias is disposed about a support shaft.

8. The card reader of claim 6 further comprising a structure to stop the urging of said bias in said first position.

9. The card reader of claim 5 wherein said second member is a C-shaped second member.

10. The card reader of claim wherein said magnetic head reads or writes data to a surface having uneven surface characteristics.

11. The card reader of claim S wherein said intersection of said grooves in said first position is the sole means of support for said magnetic head.

12. The card reader of claim 5 wherein said magnetic head is capable of rotational movement about an axis and linear movement perpendicular to said axis.

13. A method for reading information from a magnetic card comprising:
   providing a card reader with a support structure having a first support member and a second support member pivotally attached to said first support member;
   flexibly attaching a magnetic reader to said support structure by pivoting said second support member to an open position to expose an opening for attaching said magnetic reader, and returning said second support member to a closed position to flexibly secure said magnetic reader; and moving a magnetic card to be read relative to said magnetic reader.

14. The method according to claim 13 further comprising attaching said second support member to said first support member with a shaft.

15. The method according to claim 14 farther comprising disposing a bias about said shaft.

16. The method according to claim 15 further comprising biasing said first support member and said second support member toward said closed position.

17. The method according to claim 13 further comprising mounting said magnetic reader on said support structure in a manner which provides rotational movement about an axis and linear movement perpendicular to said axis to said magnetic reader.

18. The method according to claim 17 wherein said rotational movement and/or said linear movement is performed in response to motion of said magnetic reader relative to a magnetic card having uneven surface characteristics.

19. The method according to claim 13 further comprising removing said magnetic reader from said support structure by:

pivoting said second support member to said open position; and removing said magnetic reader from said support structure.

20. The method according to claim 19 further comprising attaching a new magnetic reader to said support structure and returning said second support member to said closed position.

* * * * *